INVENTOR.
JOSEPH F. BAKEL
BRINLEY A. GYORKO
BY
THEIR ATTORNEY

Feb. 16, 1971   J. F. BAKEL ET AL   3,564,379
AUTOMATIC POSITION INSPECTOR
Original Filed Aug. 10, 1967   3 Sheets-Sheet 2

INVENTOR.
JOSEPH F. BAKEL
BRINLEY A. GYORKO
BY
THEIR ATTORNEY

United States Patent Office 3,564,379
Patented Feb. 16, 1971

3,564,379
AUTOMATIC POSITION INSPECTOR
Joseph F. Bakel, Lyndhurst, and Brinley A. Gyorko, Waynesboro, Va., assignors to General Electric Company, a corporation of New York
Continuation of application Ser. No. 659,728, Aug. 10, 1967. This application July 2, 1969, Ser. No. 842,797
Int. Cl. G05b 19/28
U.S. Cl. 318—603                          20 Claims

ABSTRACT OF THE DISCLOSURE

A machine tool numerical control system with the capability of tracking the machine tool movement when the control loop is broken. The command signal and feedback signal are compared and the error is used to update the absolute position register and also the command signal itself. When the control loop is again in operation there is substantially no discrepancy between the electronic equipment indicating position and actual position.

---

The present invention is a continuation of our copending application Ser. No. 659,728, filed Aug. 10, 1967, and assigned to the same assignee as the present invention.

Numerical control systems for controlling machine tool movements are well known. In any numerical control system there are two sets of signals, these being the command signals (representing the desired position of the moving member) and the transducer signals (representing the actual position of the moving member) which are frequently referred to as the feedback signals. The two signals should be the same at all times; however, in any system the command signals change in finite steps, no matter how small, and the machine, machine tool, or table to be moved cannot assume its required position instantaneously. Consequently, on comparing the two signals, there will be, in general, a difference, called the error signal, which is used to actuate the servomotor driving the machine. The servomotor will cease to drive the machine when the error signal disappears (is below the servo threshold), i.e., when command and feedback signals are the same.

In certain numerical control systems of the type requiring absolute position registers for each axis of movement along which the machine is controlled, the absolute position register is responsive to the command signals and contains a numerical indication of the commanded position of the machine with respect to some reference point. A numerical control system, being a digital device, provides command pulses, each of which corresponds to a specific increment of distance. The overall system responds to each pulse to move the machine the specific amount of distance and the absolute position register, which is usually an up-down counter, accumulates the command pulses thereby providing an indication of the commanded position of the machine. Under normal circumstances a program, designed in accordance with the desired machine performance, controls not only the number of command pulses but also the rate at which these pulses occur and thereby controls the position of the machine and the rate of its movement.

One specific type of prior art numerical control system operates as follows: The command inputs are applied to a phase counter which provides a continuous output waveform having a substantially fixed frequency and a phase which varies in accordance with the command input. A second waveform of the same frequency and having a phase controlled by the actual position of the machine is compared with the first waveform, the phase difference between the two waveforms generating an error which is applied to the servomechanism for controlling the machine movement. The machine moves in a direction to eliminate the phase error between the two waveforms. In this manner, the direction of machine movement along the axis can be controlled by causing a phase lag of the first waveform in one case and causing a forward phase shift of the first waveform in the opposite case.

The first waveform is normally produced by a digital counter apparatus which receives high frequency clock pulses at constant rate to thereby provide an output waveform whose frequency is dependent upon the clock pulse frequency and the counter capacity. In order to vary the phase of the output waveform of this particular counter, input clock pulses are effectively subtracted from the train of clock pulses applied at the input to the counter in order to create a phase lag, and input pulses are effectively added to the train of clock pulses in order to create a phase shift forward.

As a specific example, assume a phase counter which receives clock pulses at a rate of 250,000 pulses per second to provide a 250 cycle square wave output. The elimination of one of the input pulses will cause a phase lag in the output waveform of 1/1000 of the waveform period. On the other hand, the addition of only a single pulse to the input waveform will cause a phase shift forward of an amount equal to 1/1000 of the original period.

One of the problems associated with some machine tool control systems occurs as a result of disconnecting the control loop for any reason and then reconnecting it and starting where the system left off when the control loop was disconnected or broken. If for any reason, the machine, machine tool, or machine table, is moved by some force outside of the control loop during the time that the control loop is broken, the electronics of the system will no longer reflect the actual position of the machine when the control loop is again reinserted. For example, if the machine is jogged thereby causing a small but finite amount of movement the absolute position register no longer contains a numerical value which indicates the actual position of the machine with respect to the known reference. In most processes which require the use of numerical machine tool control systems accuracy is of great importance and therefore serious error in the process can occur due to failure of the electronics to follow the machine movement during periods when the control loop is broken.

The present invention solves the problem described above by providing a tracking system which effectively tracks movement of the machine during the periods when the control loop is broken and provides control signals in the form of pulses which update the absolute position register and the phase counter. In a particular embodiment shown herein, tracking is accomplished by sensing, during periods when the control loop is broken, phase differences between the command waveform and the feedback waveform and providing an error signal comprising pulses having an average repetition rate which is proportional to the phase difference.

A complete understanding of the invention may be had by referring to the drawings and the detailed description thereof which follows, wherein.

Figure 1:
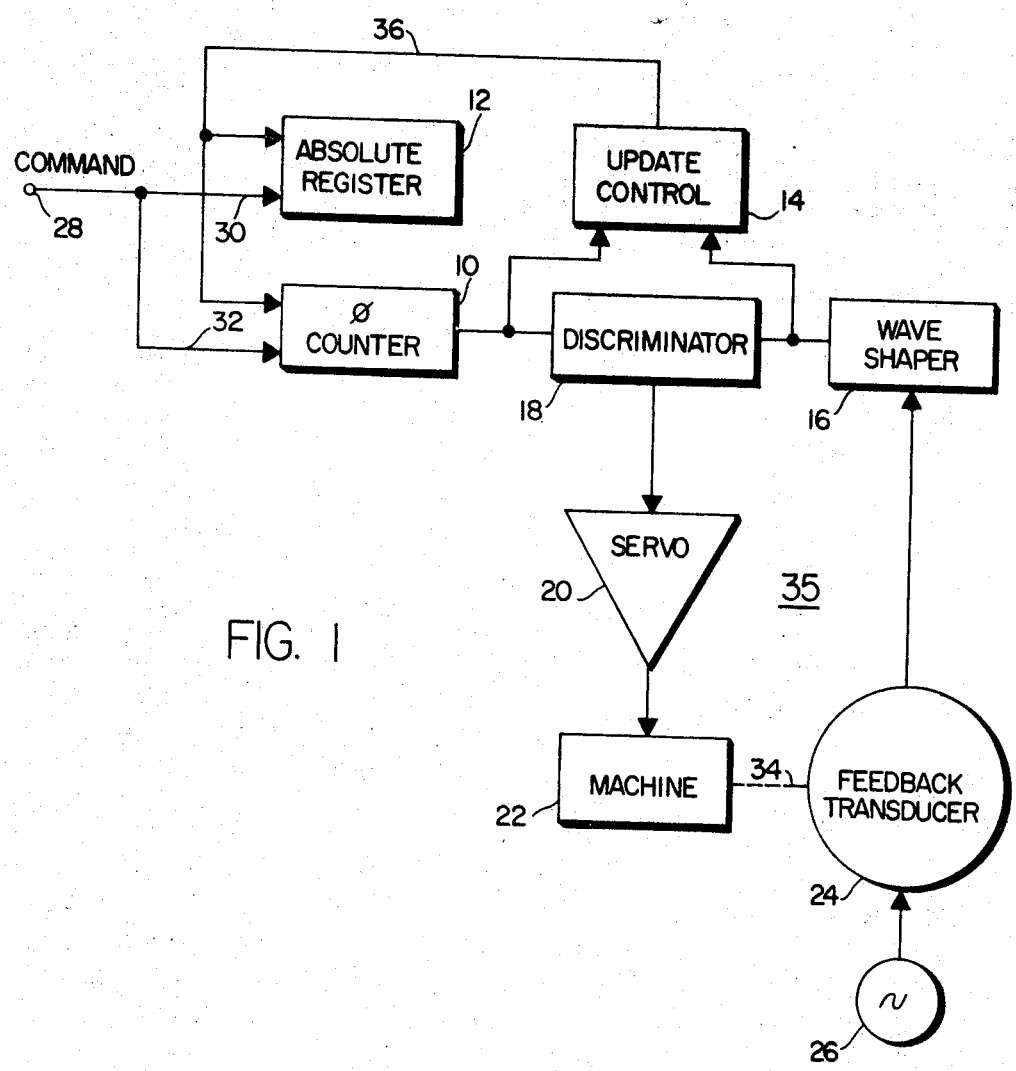
FIG. 1 is a block diagram of a control system which illustrates the relation between the functional units in a preferred embodiment of the present invention.

Referring to FIG. 1, the machine, machine tool, or machine table to be controlled as illustrated by the numeral 22, and the means for supplying the command inputs at terminal 28 may constitute any means known in the art.

The command inputs at terminal 28 are applied via leads 30 and 32 to absolute counter 12 and phase counter 10 respectively. The absolute counter 12 may be any device, many of which are well known in the art, which receives the command inputs and provides a numerical indication of the machine position (assuming the machine responds to the same commands that control the absolute counter). The phase counter may be any means which receives command inputs and provides a phase controlled output waveform. The output of the phase counter 10 is the command waveform and it is applied to one input of discriminator 18.

A source 26 provides an output sinusoidal waveform having a frequency which is equal to the frequency of the command waveform at zero commanded speed and which is applied to a conventional wave shaper 16 via a feedback transducer 24 such as a resolver. The resolver position is controlled by the machine position via mechanical linkage 34. As a result, the feedback transducer 24, in a known manner, causes the waveform input to the wave shaper to have a phase which is dependent upon the position of machine 22. Wave shaper 16 may be a square wave shaper which provides an output square wave having a frequency substantially equal to the frequency of the command waveform and a phase which is dependent upon the position of machine 22. The square wave output, which is the feedback waveform, is applied to the second input of discriminator 18.

Discriminator 18 may be any circuit, many of which are well known in the art, which detects the phase difference between two inputs and provides an output current or voltage which is proportional to the phase difference and which as a polarity dependent upon the relative phases of the two input signals. For example, if the command waveform leads the feedback waveform in phase, the discriminator output will be negative, whereas if the command waveform lags the feedback waveform in phase the discriminator output will be positive. The output from the discriminator is fed to a servomotor 20 which also may be any conventional type of servomotor which moves the machine in a direction to eliminate the phase difference between the command waveform and the feedback waveform.

The apparatus described thus far in reference to FIG. 1 is completely conventional and well known to anyone having ordinary skill in the art. Also, it will be obvious to anyone having ordinary skill in the art that the system described thus far controls movement of a machine, machine tool, or machine table on a single axis, but duplication of certain parts operates to control the machine 22 along a plurality of axes.

Figure 2:
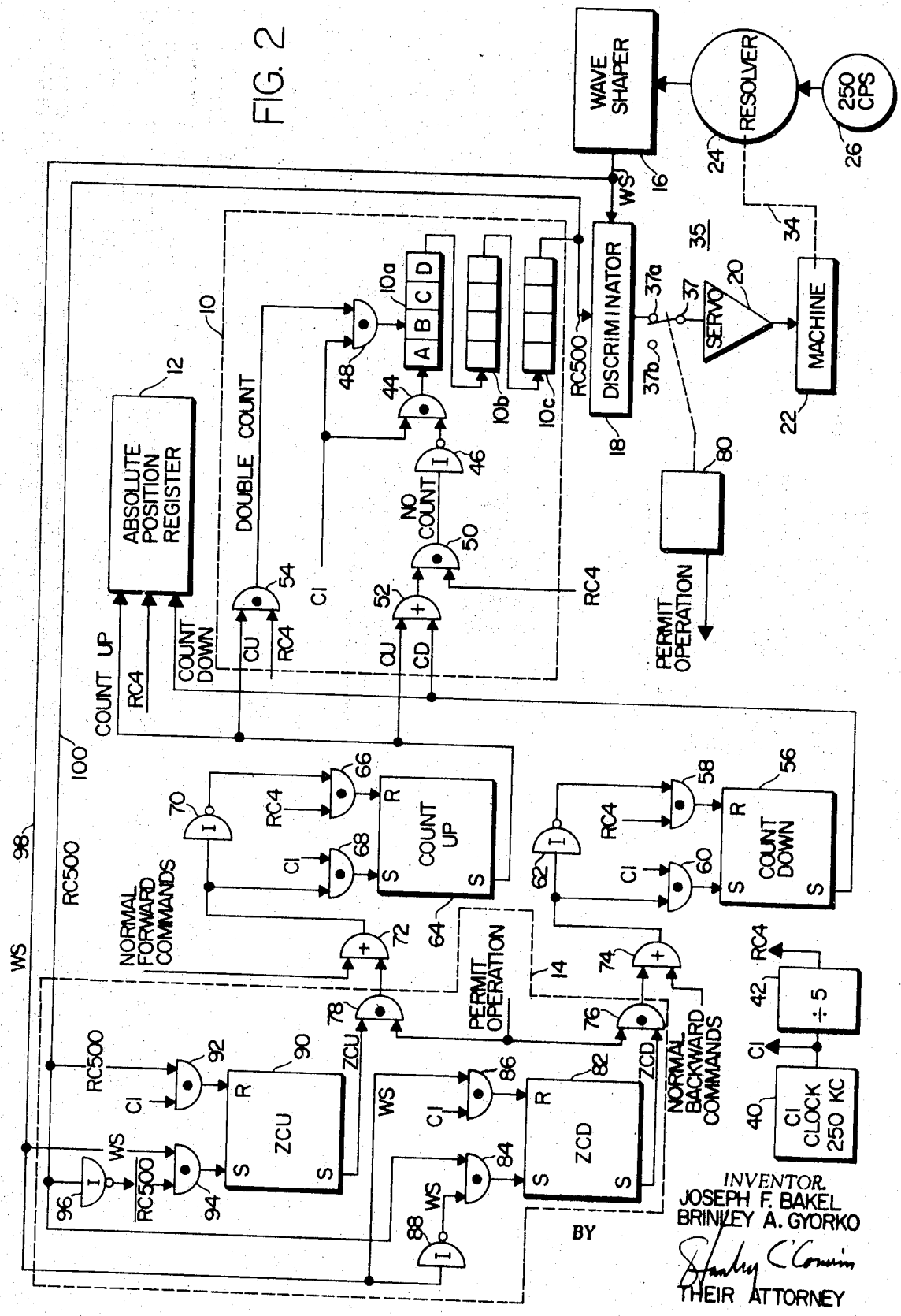
FIG. 2 is a block diagram of a preferred embodiment of the present invention.

In accordance with the present invention, a tracking system or update control means, 14, senses the phase relation between the command waveform and the feedback waveform and provides output control signals or error signals on lead 36 during the time that control loop 35 is broken or opened, as for example, between the discriminator 18 and the servo 20 as shown in FIG. 2 and further described subsequently. For purposes of illustration this is shown in FIG. 1 as involving the movement of switch 37 from contacts 37a to 37b. The error signals on lead 36 are indicative of the amplitude or magnitude, as well as the sense, of the phase difference between the phase signals available from 10 and 16 operate to update the absolute counter 12 and the phase counter 10. The absolute counter 12 is updated to follow the movement of the machine 22 and thereby always provide a correct numerical indication of the machine position. The phase counter 10 is updated by the signals via lead 36 so that substantially zero phase difference between the command waveform and the feedback waveform will be maintained despite movement of the machine and the consequent movement of resolver 24.

A preferred specific embodiment of the invention is illustrated in FIG. 2. In order to provide a better understanding of the invention, the preferred embodiment will be described with reference to certain specific timing sequences, clock frequencies, distances, etc., which are given herein only by way of example and are not intended to limit the invention in any manner. Some of the specifics, which will be used herein to describe the invention but which are not intended to be limiting in any manner are:

(1) The voltages and/or currents on any lead line are given by either a special word or special letters and numerals which designate the presence of a particular form of that voltage. The normal symbols for bilevel logic controls are used. For example, the set output of a flip-flop ZCD (Zero Count Down) may be indicated by the symbol ZCD when the flip-flop is set and by the symbol $\overline{ZCD}$ when the flip-flop is reset. Also, when the flip-flop is set it may be said that the output ZCD is "TRUE," whereas when the flip-flop is reset it may be said that the output ZCD is "FALSE." Other well known terminology used to describe bilevel logic voltages are "low" and "high." For example, in the energized condition an output may be described as being "high" and vice versa.

(2) The command waveform is designated by the symbol RC500 and the feedback waveform is designated by the symbol WS. Both nominally are 250 cycles per second square waves.

(3) The phase counter comprises three decade counters connected in series, with the last counter wired so that the output voltage is switched to a different level for every fifth input pulse to the last stage. The phase counter receives clock pulses, C1, which occur at the rate of 250,000 pulses per second.

(4) Each pulse added or subtracted to the input of the phase counter control the movement of the machine 0.0001 inch. The electronics of the system is capable of moving the machine at a rate of 300 inches per minute and this is accomplished by providing a pulse train of 50,000 pulses per second which is added to the clock pulse waveform in order to move the machine in one direction and subtracted from the clock pulse waveform in order to move the machine in the opposite direction. Each pulse added to or subtracted from the clock pulse waveform shifts the leading edge of the 250 CPS command waveform by four microseconds.

The specific embodiment shown in FIG. 2 will first be described for the situation where the control loop 35 is in operation. It will be noted that like numerals apply to the same elements in FIGS. 1 and 2 and indicate the same functional apparatus. In the lower left of FIG. 2 there is shown a clock source 40 and a divider 42. The clock source 40 provides output pulses indicated by the symbol C1 at the rate of 250,000 pulses per second. A second train of pulses, occurring at the rate of 50,000 pulses per second, indicated by the symbol RC4, may be generated by connecting pulse train C1 to the input of a divide by 5 counter 42 or any other similar means which will provide a train of pulses at the desired rate and synchronized with the clock pulses, C1.

The phase counter 10 comprises series connected decade counters 10a, 10b and 10c, and input Logic gates 52, 54, 50, 48, 46 and 44. Although the Logic gates are illustrated as being part of the phase counter 10, it will be apparent that the Logic gates may exist outside of the phase counter. The four stages of decade counter 10a are designated by the letters A, B, C and D respectively. Under normal conditions when the servoloop 34 is closed, the system receives commands from some external means, for example a program designed to move the machine in a desired manner. The commands appear as inputs to OR gates 72 and 74. A command corresponding to a Normal Forward Command appears at the input to OR gate 72 in the form of a gate voltage, and the command in a form of Normal Backward Command appears at the input to OR gate 74 in the form of a gate voltage. The gate voltages, as described, appear at different times, the former appearing when it is desired to move the machine in a forward direction and the latter appearing when it is desired to move the machine in a backward direction. It will be noted that the terms forward and backward have no absolute meanings but are merely relative terms to indicate that the machine can be moved in opposite directions along a single axis. Also, during periods when it is not desired to move the machine in either direction there will be no gate voltages at the inputs to OR gates 72 and 74. When there is no command to move the machine 22, the count up flip-flop 64 will be reset and the count down flip-flop 56 will also be reset. The set output of count up flip-flop 64, designated CU, is applied to the first input terminal of absolute position register 12; the set output designated CD of count down flip-flop 56 is applied to the second input terminal of the obsolute position register 12; the clock pulses RC4 are applied to the trigger input of the absolute position register 12.

As is well known, the absolute position register is an up-down counter which accumulates the trigger inputs and counts up if the gating voltage on the first terminal is present and counts down if the gating voltage on the second terminal is present. If neither gating voltage is present, the absolute position register will not accumulate any of the trigger inputs. Thus, in the condition described when there are no forward or backward commands the absolute position register will not accumulate any clock pulses, the output being an indication of the present position of machine 22. The clock pulses C1 will be applied to the first stage of decade counter 10a via AND gate 44 causing the phase counter 10 to provide the output RC500 which is a square wave having a nominal frequency of 250 cycles per second.

Machine movement is created by varying the phase of the leading edge of RC500 and this in turn is accomplished by effectively subtracting pulses from the clock pulse waveform or adding pulses to the clock pulse waveform. When a Normal Forward Command is received at OR gate 72 it passes through OR gate 72 and is applied as one input to AND gate 68; the other input to AND gate 68 being clock pulses C1. The first clock pulse occuring after the Normal Forward Command is received triggers count up flip-flop 64 thereby setting that flip-flop and providing inputs to the first terminal of absolute position register 12 and the first terminal of AND gates 54 and 52. As long as the Normal Forward Command is present the output of INVERT gate 70 will be low thereby preventing count up flip-flop 64 from being reset. As soon as the Normal Forward Command is removed the output from INVERT gate 70 will be high and the next RC4 pulse will reset count up flip-flop 64.

During the period that count up flip-flop 64 is set CU will be present causing the absolute position register 12 to count forward at a rate determined by clock pulses RC4. The signal CU passes through OR gate 52 and energizes the upper input of AND gate 50. The lower input of AND gate 50 is energized by the pulses RC4. Thus, each time an RC4 pulse occurs there is provided an output of AND gate 50, designated NO COUNT, which is applied to INVERT gate 46 thereby lowering or de-energizing the input to AND gate 44. When that occurs the coincident clock pulse C1 will not pass through AND gate 44 to trigger the first stage of the decade counter 10a. The inputs CU and RC4 are also applied to AND gate 54, the output being designated as DOUBLE COUNT and being applied along with clock pulses C1 to a further AND gate 48.

As a result of the logic described thus far, whenever CU is "TRUE," every RC4 pulse will cause the coincident C1 pulse to be blocked from triggering the first stage of decade 10a and being routed to trigger the second stage of decade counter 10a. The counter thus counts by two's anytime RC4 is present and this has the same effect as if pulses were added to the clock pulse train at the rate of 50,000 pulses per second during the time that the Normal Forward Command gate is present. The double counting causes the leading edge of RC500 to shift forward in time resulting in an error output from the discriminator 18 which controls servo 20 to move machine 22 in the forward direction.

The presence of a Normal Backward Command at the input to OR gate 74 causes an output therefrom which energizes the first terminal of AND gate 60; the second terminal being energized by clock pulses C1. As soon as the first clock pulse C1 occurs following the presence of the Normal Backward Command gate, count down flip-flop 56 will be set resulting in the presence of output CD. the count down flip-flop 56 will remain in the set condition until the Normal Backward Command gate is removed and RC4 occurs thereby resetting flip-flop 56 via INVERT gate 62 and AND gate 58.

The output CD is applied to the second terminal of absolute position register 12 causing the absolute position register to count down at a rate determined by the clock pulses RC4. The output CD is also applied as one input to OR gate 52 whose output in turn energizes AND gate 50. The occurrence of each RC4 pulse causes a NO COUNT output from AND gate 50 which operates to block pulses C1 from passing through AND gate 44. Under these conditions, since AND gate 44 is blocked and AND gate 48 is not energized, the locic effectively subtracts clocks pulses from triggering the first stage of the decade counter 10a at the rate of 50,000 pulses per second. The subtraction of pulses in the manner described results in a phase lag of the waveform RC500 causing an output from discriminator 18 which controls servo 20 to move the machine in the backward direction until the fedeback waveform WS has the same phase as the command waveform RC500.

As mentioned above, the present invention operates to update the electronics during the period that the control loop 35 is broken. A breaking or opening of the control loop 35 is indicated diagrammatically by the switch 37 having terminals 37a and 37b. As shown in the drawing, the control loop is in operation since switch 37 is connected to terminal 37a. When the control loop is broken a mechanical or electronic linkage between the switch 37 and a gate generating device 80 causes the gate generating device 80 to provide an output designated PERMIT OPERATION which is used to gate on the tracking circuitry. In the specific example described herein, the term "updating the electronics" means to adjust the contents of the absolute position register so that it reflects accurately the position of the machine and to control the phase counter so that there will be substantially zero difference in phase between RC500 and WS.

Figure 3A:
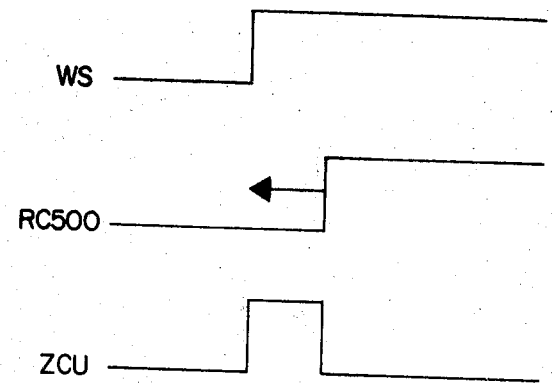
FIGS. 3a and 3b are waveform diagrams which are helpful in understanding the operation of the apparatus illustrated in FIG. 2.

To illustrate the tracking system the following discussion will be based on the assumption that when the servo loop is broken there is no phase difference between RC500 and WS, and also the absolute position register 12 is accurate. The present condition would occur if the servo loop is disconnected after at least a short but a finite time following the last command. Under the latter circumstances the waveforms RC500 and WS will be in phase until such time as the machine is moved, say for example by jogging. Once the machine is moved, the waveform WS will be shifted in phase in a direction of machine movement. Assuming that the machine is jogged forward, the new relation between WS and RC500 will be as illustrated in FIG. 3a where it is shown that the leading edge of waveform WS leads the leading edge of waveform RC500. The arrow crossing the leading edge of waveform RC500 indicates the necessary direction of movement of the leading edge in order to adjust it so that the two waveforms will be in phase.

The waveform WS is applied via lead 98 to one input terminal of AND gate 94. The waveform RC500 is applied via lead 100 as one input to AND gate 92 and further through INVERT gate 96 to the second input of AND gate 94. AND gates 94 and 92 are the set and reset input gates respetively of ZCU (Zero Count Up) flip-flop 90. Referring again to FIG. 3a as well as to FIG. 2, it can be seen that during the low portions of WS and RC500, AND gate 94 will be de-energized. As soon as the leading edge of WS is reached, causing WS to become high, AND gate 94 is energized thereby triggering ZCU 90 into the set state. ZCU 90 will remain in the set state until the occurrence of the first clock pulse C1 following the leading edge of RC500. Thus, the output ZCU is a pulse having a duration which is an analog of the phase difference between WS and RC500 and whose lagging edge is synchronized with the clock pulses. The output pulse is indicated by the waveform ZCU in FIG. 3a. It will be noted that if RC500 was leading WS rather than lagging behind WS the flip-flop ZCU 90 would not be set at all.

The output ZCU is applied through AND gate 78 to the second input of OR gate 72. AND gate 78 is energized by a PERMIT OPERATION gate voltage which is present only when the servo loop is broken. Once the output ZCU passes through OR gate 72 is controls the system in the same manner as a Normal Forward Command, with the exception that any output from the discriminator is not applied to the servo system. Specifically, during the presence of ZCU the phase counter 10 receives every fifth clock pulse at the second stage of decade counter 10a resulting in a phase shift forward of the output RC500. Also, the absolute position register counts forward during that time at a rate determined by the clock pulses RC4. It will be noted, that in this specific example described herein, the electronics tracks the machine movement at the rate of 300 inches per minute. If the machine happens to be jogged into a faster motion, all that means is that it will require more than one cycle of the command and feedback waveforms in order to correctly update the electronics.

Figure 3B:
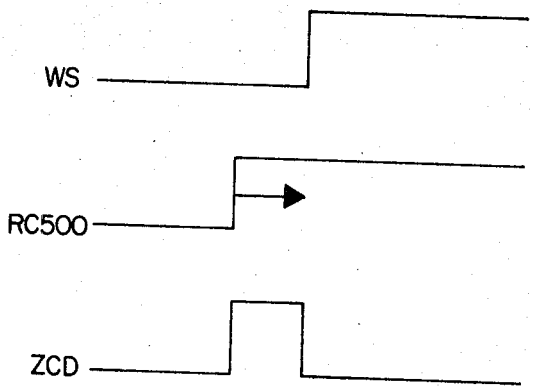

Referring to FIGS. 3b and 2 the tracking system will now be described for circumstances wherein the machine is moved in a backward direction causing WS to be lagging in phase behind RC500. The relation between the phases of WS and RC500 are indicated by the first two waveforms in FIG. 3b. The arrow which crosses the leading edge of RC500 indicates the direction in which the waveform RC500 must be shifted by the tracking system. Waveform WS is applied via lead 98 to one input of the reset triggering AND gate 86, the other input being the clock pulses C1. The waveform WS is also applied via INVERT gate 88 to one input of the set triggering AND gate 84. The other input to set triggering AND gate 84 is waveform RC500.

During the period when WC and RC500 are low, indicated by the initial portion of the waveforms in FIG. 3b, the $\overline{WS}$ input to AND gate 84 will be high and the RC500 input to AND gate 84 will be low. The ZCD flip-flop 82 will be in the reset state. As soon as the leading edge of RC500 is reached the RC500 input to AND gate 84 will go high thereby providing a triggering input to the set terminal of ZCD flip-flop 82 causing that flip-flop to change to the set state. When in the set state ZCD flip-flop 82 will provide an output ZCD indicated by the third waveform in FIG. 3b. The flip-flop 82 will remain in a set state until the occurrence of the first clock pulse following the leading edge of WS. In other words, as soon as the leading edge of WS is reached, the WS input to reset AND gate 86 goes high and the occurrence of the next clock pulse C1 causes an output from AND gate 86 to trigger the reset input terminal of ZCD 82. The result is an output ZCD in the form of a gate pulse such as that indicated in FIG. 3b.

The output ZCD passes through AND gate 76 which is energized during the period in which the loop is broken and through OR gate 74. When ZCD passes through OR gate 74 it operates on the absolute position register 12 and the phase counter 10 in the same manner as a Normal Backward Command. Specifically, it causes the absolute position register 12 to count down at a rate determined by clock pulses RC4 and causes every fifth clock pulse C1 to be blocked from triggering the first stage of decade counter 10a. The waveform RC500 is thus shifted in phase to bring it in line with the waveform WS. It will be noted that if RC500 lags in phase behind WS or is in phase with WS the ZCD flip-flop 82 will not be set and there will be no ZCD output.

When the servo loop is reconnected, the absolute position register will accurately reflect the position of the machine and the waveforms RC500 and WS will be in phase. It should also be noted that updating is necessary and is carried out by the tracking system even for certain conditions when the machine is not moved during periods in which the control loop is broken. For example, assume that the device is operating in response to Normal Commands and all of a sudden the control loop is opened. Since the electronics responds faster than the machine movement, the absolute position register will reflect the machine position assuming that the machine accurately responded to the last command. Thus, since the control loop is opened in this particular example prior to the time that the last command is completely executed the absolute position register will not be an accurate reflection of the machine position. Also, the waveforms RC500 and WS will be out of phase since the phase counter had time to respond to the last command but the machine and consequently the resolver did not have sufficient time.

The tracking system will then respond to the phase difference between RC500 and WS, in a manner described above, to update the absolute position register 12 to register the correct position of the machine and to shift the phase of RC500 so that it is in coincidence with the phase of WS.

The invention described above is directed to numerical control system in which a tracking system updates the electronics during the period in which the control loop is broken. Although the invention was described with reference to a specific embodiment, it will be apparent to anyone having ordinary skill in the art to which the invention pertains that there may be many changes and modifications of the specific embodiment which fall within the spirit, intent and scope of the invention. As an example, if an up-down counter which does not indicate a negative count is used for the absolute position register, the count up and count down inputs to the counter could be reversed by simple logic gating means so that when the machine is on the negative side of zero (an arbitrary designation) a count up command causes the absolute position register to reduce its absolute value and a count down command causes the absolute position register to increase its absolute value. The simple Logic gates would be controlled by a simple detector means which detects when the register passes through zero thereby indicating whether the machine is on the negative side of zero or on the positive side of zero.

Furthermore, the particular Logic gate arrangements should by no means be considered as limiting the invention since it will be apparent to anyone having ordinary skill in the art that the identical overall logic functions can be performed by numerous rearrangements of logical gates. As a simple example, a NAND gate may be substituted for a combination of an AND gate having an INVERT gate in its output.

Also, it is not intended that the invention be limited to a numerical control system in which the discriminator provides a positive or negative voltage output to a servomotor. The invention will operate equally as well with a numerical control system of the type normally referred to as a GO-NO GO control loop. In the latter type systems, the discriminator has two outputs which directly control forward and backward motion of the machine. If the forward output lead is energized the machine moves forward; if the backward output lead is energized the machine moves backward. An output lead will remain in the energized condition or GO condition until the command and feedback waveforms are in phase.

What is claimed and desired to be secured by the United States Letters Patent is:

1. In a numerical control system of the type having a command signal generator responsive to controlling input signals for generating a command signal which varies with said controlling input signals; a control loop which comprises a device to be moved, a feedback signal generating means responsive to the position of said device for generating a feedback signal which varies in accordance with said position, a comparator means responsive to said feedback and said command signals for generating an error output determined by the difference between said feedback and command signals, and means responsive to said error output for moving said device in a direction to reduce said difference; and an absolute position register responsive to said controlling input signals for registering an indication of the desired position of said devce; the improvement comprising:

device position tracking means responsive to the difference between said feedback and command signals during periods when said control loop is open for adjusting said absolute position register to accurately reflect device position and for correcting said command signal generator to reduce said difference.

2. A numerical control system as described in claim 1, wherein the phase of said command signal varies with said controlling input signals, the phase of said feedback signal varies with the position of said device and said error output is determined by the phase difference between said feedback and command signals.

3. A numerical control system as described in claim 2 wherein said tracking means comprises;

a first phase detector responsive to said command signal lagging said feedback signal for generating a first output gate pulse having a duration dependent upon the magnitude of the phase lag, and a second phase detector responsive to said command signal leading said feedback signal for generating a second output gate pulse having a duration dependent upon the magnitude of the phase lead.

4. A numerical control system as described in claim 3 wherein said absolute position register is an up-down digital counter and wherein said numerical control system further comprises;

logic means responsive to said first gate pulse for causing said up-down counter to count in a first direction for the duration of said first gate pulse, and logic means responsive to said second gate pulse for causing said up-down counter to count in a second direction, opposite to said first direction, for the duration of said second gate pulse.

5. A numerical control system as described in claim 4 wherein said system includes a clock pulse generator for generating clock pulses, a rate controlling generator means for generating rate output pulses sychronized to said clock pulses and having a repetition rate equal to or less than the clock pulse repetition rate, and wherein said command signal generating means is a digital counter means which produces a square wave output having a frequency determined by the counter capacity and the input pulse repetition rate and which comprises, a normally unblocked input terminal connected to a stage of said counter, and normally blocked input terminal connected to a stage of said counter which causes said counter to register a higher count than the actual number of pulses applied thereto, the output of said clock pulse generator being connected to said blocked and unblocked terminals, said numerical control system further comprising;

logic means responsive to one of said gate pulses for blocking said normally unblocked input terminal and for unblocking said normally blocked input terminal at a rate determined by said rate output pulses, and logic means responsive to the other of said gate pulses for blocking said normally unblocked input terminal at a rate determined by said rate output pulses.

6. A source of first signals comprising a feedback transducer for producing signals whose phase with respect to a reference phase is determined by the position of a sensed object, a source of second phase signals comprising a variable phase counter for producing signals whose phase with respect to said reference phase may be adjusted, means responsive to said first and said second signals to produce output pulses having an average repetition rate proportional to the difference in phase between said first and said second signals and a sense indicative of the direction of said difference, said variable phase counter responsive to said output pulses to count up or count down at a rate in accordance with the sense and repetition rate of said output pulses respectively to vary the phase of said second signals toward agreement with the phase of said first signals.

7. An arrangement according to claim 6 further comprising means for utilizing said output pulses.

8. A source of first phase signals whose phase with respect to a reference phase may vary, a source of second phase signals whose phase with respect to said reference phase may be adjusted, means responsive to said first and said second signals to produc output pulses having and said second signals to produce output pulses having between said first and second signals and a sense indicative of the direction of said difference, said source of second signals comprising means responsive to said output pulses to count up or count down at a rate in accordance with the sense and the repetition rate of said output pulses respectively to adjust the phase of said second signals toward agreement with the phase of said first signals.

9. An arrangement according to claim 8 comprising means for utilizing said output pulses.

10. A phase to pulse train converter comprising means for accepting a first signal of a periodic nature the phase of which with respect to a reference phase contains input information, means for generating a second phase signal of substantially the same periodicity as said first signal including means for adjusting its phase with respect to said reference signal, means for comparing said first signal and said second signal to generate an error signal indicative of any phase difference, said error signal comprising a pulse train indicative of said phase error, and means for using said pulse train error signal as a useful output signal containing substantially the same information contained in the phase of said first phase signal comprising means for using said pulse train error signal for controlling said phase adjusting means to adjust the phase of said second signal toward correspondence with the phase of said first signal.

11. A phase angle to digital converter comprising means to accept a first input signal having information content associated with its phase position relative to a reference phase position, means to generate a second internal signal whose phase with respect to said reference phase may be adjusted, means to compare the phase of said first signal with the phase of said second internal signal to develop an error signal indicative of the amplitude and direction of the phase difference, means responsive to said error signal to adjust the phase of said second internal signal so that it is substantially in agreement with said first input signal, said error signal comprising a series of pulses occurring consecutively in the time domain and having a number substantially proportional in a given interval of time to the sum of the initial phase displacement between said first and second signals and any phase displacement of said first signal with respect to said reference phase position in the same interval of time, said error signal further comprising an output signal in which the number of pulses in any interval of time is substantially proportional to the change of phase of said first signal with respect to said reference signal in the same time interval.

12. A source of first phase signals whose phase with respect to a reference phase may vary independently, a source of second phase signals whose phase with respect to said reference phase may be adjusted, means responsive to said first and said second signal to produce an error signal indicative of the amplitude and sense of the phase difference between said first and second phase signals, said error signal comprising a train of pulses whose repetition rate is indicative of the amplitude of said phase difference, and means responsive to said error signal to adjust the phase of said second signal toward agreement with the phase of said first signal.

13. A source of first phase electrical signals whose phase with respect to a reference phase may vary independently, a source of second phase electrical signals whose phase with respect to said reference phase may be adjusted, means responsive to said first and said second signals to produce pulses having a repetition rate indicative of the amplitude of the phase difference between said first and second signals, and providing a sense of said phase difference and means responsive to said second signal and said error signal to adjust the phase of said second signal toward agreement with the phase of said first signal.

14. A source of first phase signals whose phase with respect to a reference phase may vary independently, a source of second phase signals whose phase with respect to said reference phase may be adjusted, means responsive to said first and said second signals to produce an error signal indicative of the amplitude and sense of the phase difference between said first and second signals, said error signal being comprised of a train of pulses whose average pulse repetition rate is a function of said phase difference, and means responsive to said error signal to adjust the phase of said second signal toward agreement with the phase of said first signal.

15. A system such as claim 14 further comprising utilization means, and means responsive to said error signal to operate said utilization means as a function of said error signal.

16. A system such as claim 15 comprising means for integrating said error signal with respect to time so that over any interval of time said integrated error signal is a function of the algebraic summation of an initial phase error between said first and second signals and all subsequent phase changes of said first signal with respect to said reference signal during said interval of time.

17. A system such as claim 16 in which said integrating means is comprised of an output register which is continually updated by said error signal to continually represent the present phase position of said first signal with respect to a reference phase.

18. An arrangement according to claim 14 in which the error signal is used as an output signal.

19. An arrangement according to claim 18 in which the amplitude of error is indicated by the number of pulses comprising the error signal.

20. An arrangement according to claim 19 in which the sense of the error is indicated by the presence of the error signal on one of two alternate signal channels.

References Cited

UNITED STATES PATENTS

| | | | |
|---|---|---|---|
| 3,011,110 | 11/1961 | Xu-Chi Ho et al. | 318—162X |
| 3,122,686 | 2/1964 | Davies et al. | 318—18 |
| 3,320,501 | 5/1967 | Davies | 318—29X |
| 3,374,359 | 3/1968 | Anderson | 318—28X |
| 3,395,322 | 7/1968 | Peterssen et al. | 318—489X |
| 3,400,314 | 9/1968 | Wilson | 318—162X |

BENJAMIN DOBECK, Primary Examiner

U.S. Cl. X.R.

318—608

UNITED STATES PATENT OFFICE
CERTIFICATE OF CORRECTION

Patent No. 3,564,379          Dated February 16, 1971

Inventor(s) Joseph F. Bakel and Brinley A. Gyorko

It is certified that error appears in the above-identified patent and that said Letters Patent are hereby corrected as shown below:

Column 5, line 15, "obsolute" should be -- absolute --; Column 6, line 26, "locic" should be -- logic --; Column 7, line 2, "respetively" should be -- respectively --; Column 9 line 20, "devce" should be -- device --; Column 9, line 58, "sychronized" should be -- synchronized --; Column 10, line "produc" should be -- produce --; Column 10, line 28, After "having" insert -- an average repetition rate proportional to the difference in phase --; Column 10, line 29, delete entire line starting with "and" and ending with "having" (duplicati Signed and sealed this 14th day of March 1972.

(SEAL)
Attest:

EDWARD M. FLETCHER, JR.          ROBERT GOTTSCHALK
Attesting Officer                Commissioner of Patents